May 11, 1965 K. C. McCARTNEY 3,183,317
ROTARY SWITCH EMPLOYING TWO-STEP RELEASING MECHANISM
AND RESET ENERGY STORAGE MEANS
Filed July 23, 1963 3 Sheets-Sheet 1
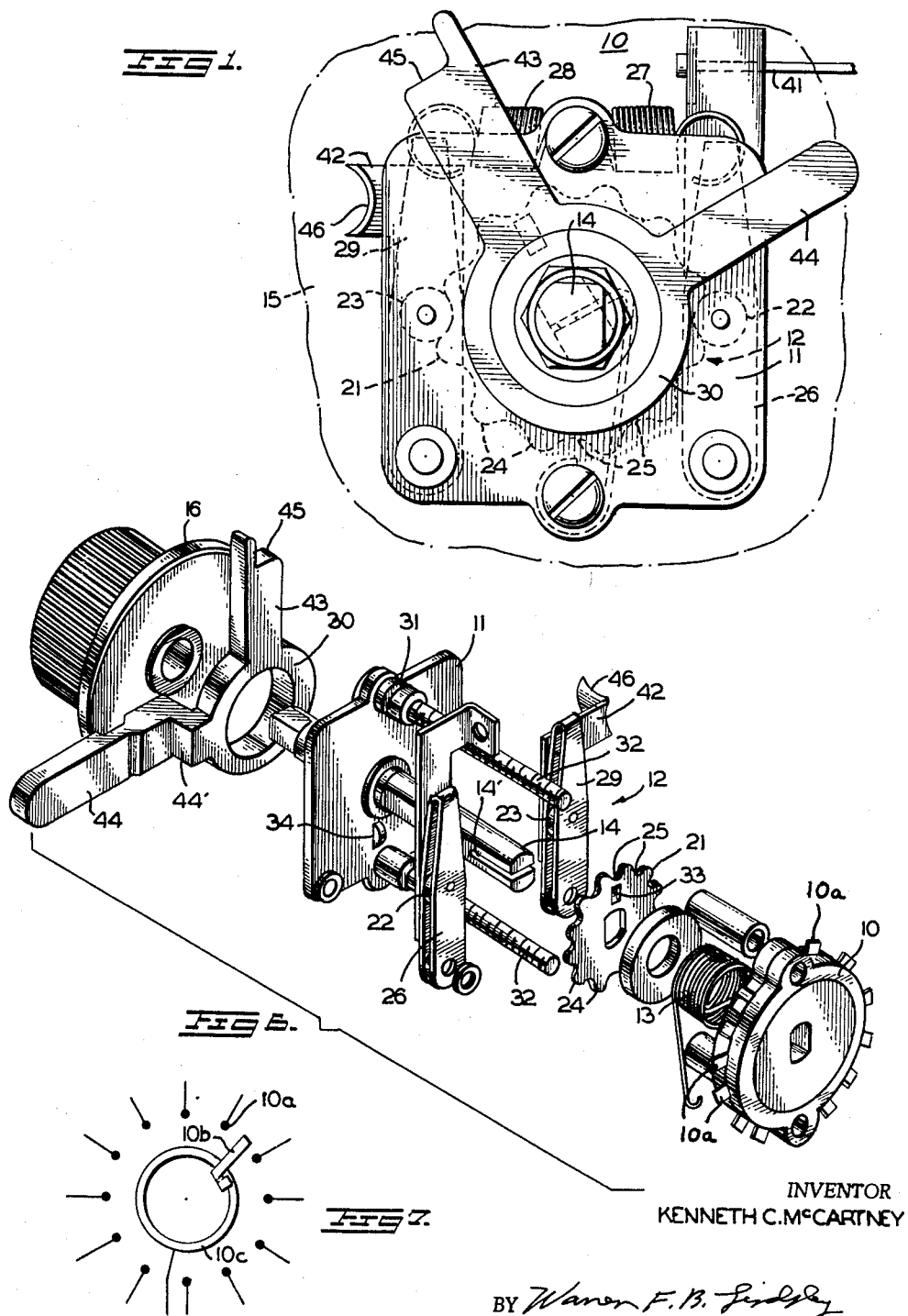
INVENTOR
KENNETH C. McCARTNEY
BY
ATTORNEY May 11, 1965    K. C. McCARTNEY    3,183,317
ROTARY SWITCH EMPLOYING TWO-STEP RELEASING MECHANISM
AND RESET ENERGY STORAGE MEANS
Filed July 23, 1963    3 Sheets-Sheet 2
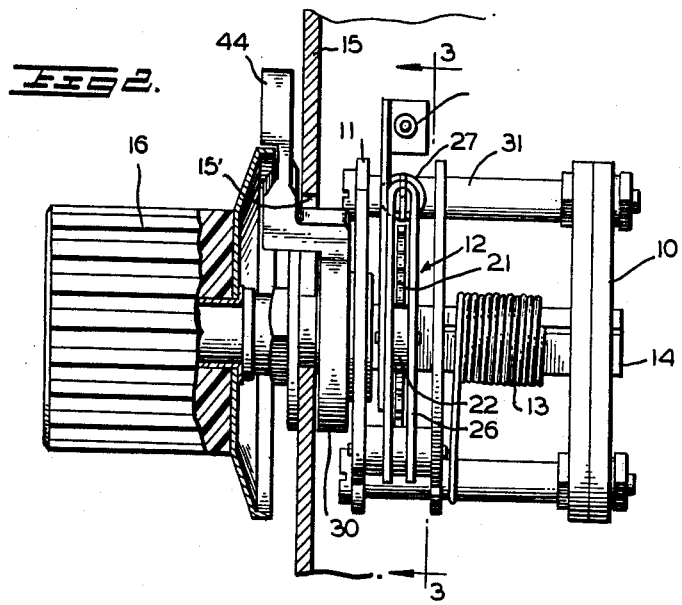
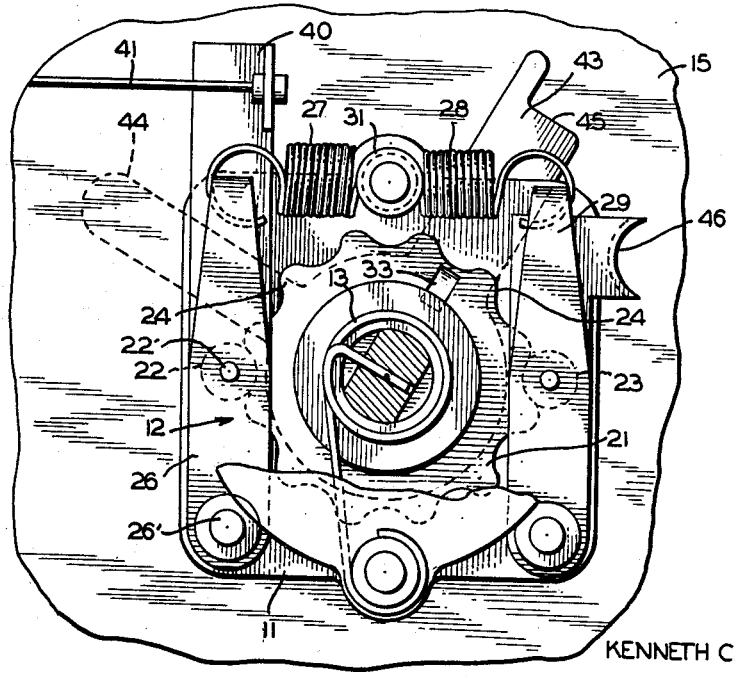
INVENTOR
KENNETH C. McCARTNEY
BY *Warren F. B. Lindsley*
ATTORNEY May 11, 1965

K. C. McCARTNEY 3,183,317

ROTARY SWITCH EMPLOYING TWO-STEP RELEASING MECHANISM
AND RESET ENERGY STORAGE MEANS

Filed July 23, 1963

INVENTOR
KENNETH C. McCARTNEY

BY Warren F. B. Lindsley
ATTORNEY

United States Patent Office 3,183,317
Patented May 11, 1965

3,183,317
ROTARY SWITCH EMPLOYING TWO-STEP RELEASING MECHANISM AND RESET ENERGY STORAGE MEANS
Kenneth C. McCartney, Phoenix, Ariz., assignor to General Electric Company, a corporation of New York
Filed July 23, 1963, Ser. No. 297,155
6 Claims. (Cl. 200—18)

This invention relates generally to rotary switches and more particularly to rotary switches designed to be reset to a reference position.

Rotary reset switches find many applications and are particularly useful where a number of rotary switches are arranged on a face panel of electrical equipment for "dialing into" the equipment certain desired information. Each switch is generally arranged to control separate electrical circuits associated therewith and the desired information may be individually entered on each switch.

In such arrangements, it is awkward and time-consuming if the operator, who manually "dials" the information, begins his insertion of information or "dialing" operation with prior information "dialed into" the equipment since the operator must then scan all switches and adjust all switches for each transaction. With each switch being set in accordance with the previously "dialed" information, the new setting is particularly susceptible to errors. Fewer errors occur if the switches are all operated from a standard reference position and the operator always starts from this known reference.

Although there are available commercial devices which accomplish the function of returning a switch to zero or a reference position, these devices generally operate on the principle of a rotary solenoid. Such devices are costly and structurally objectionable, particularly in arrangements where several switches are required to be mounted on a single panel. It can readily be appreciated that the weight and size of such devices present serious design difficulties in electrical equipment, such as, for example, test equipment and computers where the tendency is to stress compactness and simplicity.

Accordingly, it is an object of this invention to provide an improved rotary switch which is capable of being returned to a reference position and which is relatively simple and economical in construction, yet highly effective and efficient in operation.

Another object of this invention is to provide an improved rotary switch which may be automatically reset to a reference position upon receiving an electrical signal.

A further object of this invention is to provide a switch which can be ordered to return to a reference position or not at the operator's will without interfering with the independent operation of other switches in the same system.

A still further object of this invention is to provide an improved rotary switch which may be reset to a reference position by either a manual or automatic operation.

In carrying out the present invention, in one illustrative form thereof, there is provided a selector switch mechanism including a series of stationary contacts arranged in sequence and one or more movable contacts arranged to engage the stationary contacts in sequence. The movable contact is mounted on a rotatable shaft, and indexing means are provided for indexing the movable contact into aligned engagement with the stationary contacts. The indexing means comprises a cam or star wheel mounted on the shaft and a pair of followers resiliently biased for engagement with the star wheel and arranged for limited movement upon rotation of the shaft. An energy storage means is provided on the shaft to rotate the star wheel and shaft and reset the switch to its reference position when both followers are disengaged from the star wheel simultaneously.

For resetting the switch, each of the followers is mounted on a lever which may be selectively operated manually or automatically to effect disengagement of the corresponding follower from the star wheel. In one particular form of the invention, a manually operated lever arm is provided for disengaging one of the followers, while the other follower is arranged to be disengaged from the star wheel by the pulsing of a solenoid. Thus, the rotary switch may be arranged to be reset either by the operation of the lever arm or the pulsing of the solenoid, which ever is last to occur.

While the specification concludes with claims particularly pointing out and distinctly claiming the subject matter regarding the invention, it is believed that the invention will be better understood from the following description taken in connection with the accompanying drawings.

FIG. 1 is a front view of a rotary reset switch incorporating this invention, with a portion removed for clarity.

FIG. 2 is a side view of the rotary switch.

FIG. 3 is a rear view of the rotary switch with portions broken away.

FIG. 6 is an exploded view of the rotary switch.

FIG. 7 is a generally schematic view showing the contact arrangement.

Figure 4:
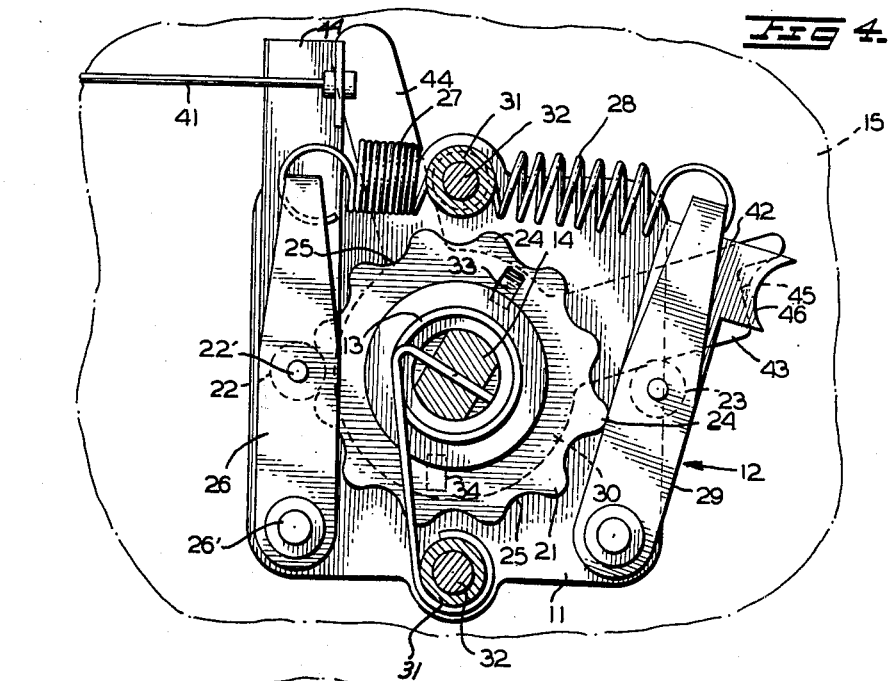
FIG. 4 is a view similar to FIG. 3 showing the parts in a different position.

Referring to FIGS. 1–6, the rotary switch, in general, comprises a selector switch mechanism 10, a frame plate 11, an indexing mechanism 12 and energy storing means 13, all assembled on a common rotatable shaft 14. The selector switch mechanism 10, which may be of conventional design, includes a series of stationary contacts 10a arranged in sequence and one or more movable contacts 10b arranged for connecting a ring 10c with any selected one of the stationary contacts 10a. (The contact arrangement is shown schematically in FIG. 7.) If desired, several banks of stationary contacts and corresponding movable contacts may be assembled on the rotatable shaft 14 depending on the number of contact positions necessary. The selector switch mechanism 10 is adapted to be operated by means of the rotatable shaft 14 which extends coaxially with the common center line of the switch mechanism and is adapted for rotation in a forward or reverse direction for moving the movable contact 10b into selective engagement with any of the stationary contacts 10a.

The rotary switch is assembled on one side of face panel 15 with the shaft 14 extending therethrough. For selective positioning of the switch mechanism 10 by an operator, there is provided a knob or dialing mechanism 16 affixed to the shaft 14. Suitable indicia, corresponding to the positions of the switch mechanism, are provided external of the face panel 15. The indicia may take the form of a face plate mounted on the shaft or may be placed on the face panel 15 in any convenient manner such as stamping, decals, engraving or the like.

For indexing the movable contact 10b of the selector switch mechanism 10 into aligned engagement with any of the stationary contacts, there is provided the indexing mechanism 12. As shown in FIGS. 1–6, the indexing mechanism 12 may comprise, for example, an indexing cam or star wheel 21 fixedly mounted on rotatable shaft 14 and a pair of resiliently biased followers or rollers 22, 23 which are arranged to ride over the peripheral surface of the star wheel 21. The followers 22, 23 cause the rotatable shaft 14 and selector switch mechanism 10 to be indexed into a series of positions angularly spaced to correspond to the desired contact switch positions.

The shaft 14 is non-circular in shape and the apertures in the star wheel 21 and switch mechanism 10 are similarly shaped, as best shown in FIG. 6, to insure rotation of the star wheel and switch mechanism with the shaft 14. The star wheel 21 is of conventional design having a series of spaced radial teeth 24 and intermediate depressions or valleys 25 on its peripheral edge.

Follower 22 is rotatably mounted by a pin 22' on a bifurcated lever 26. The lever 26 is pivotally mounted at 26' on the frame plate 11. Follower 23 is rotatably mounted on a bifurcated lever 29 and the lever 29 is pivotally mounted on the frame plate 11. To bias the followers inwardly into engagement with the peripheral surface of the star wheel, each follower and corresponding bifurcated lever is provided with a biasing spring which urges the corresponding follower into engagement with the peripheral surface of the star wheel 21. Thus follower 22 is biased inwardly by means of spring 27 connected between the free end of the bifurcated lever 26 and a spacer 31, while follower 23 is similarly biased inwardly for engagement with the star wheel 21 by spring 28 connected between the free end of the other bifurcated lever 29 and the spacer 31. The biasing springs 27, 28 urge the followers into engagement with the star wheel 21 but permit movement of the followers in and out of the star wheel valleys 25 and over the teeth 24. The pivoted mounting of each of the bifurcated levers 26 and 29 also permits bodily swinging of the associated follower away from the star wheel 21 to permit disengagement of the follower from the star wheel 21.

Upon rotation of the shaft 14 the followers 22, 23 follow the configuration of the star wheel 21 until each follower is aligned with and moves inwardly to the bottom of one of the valleys 25. When so positioned, the followers 22, 23 resist further rotation of the shaft 14 until a sufficient rotational force is applied to the shaft 14 to move the followers 22, 23 outwardly over the sides of the teeth 24 against the counteracting resilient force of the biasing springs 27, 28.

The valleys 25 on the peripheral surface of the star wheel 21 thus determine the rest positions of the shaft 14. The star wheel 21 is positioned by the shaft so that the rollers lie in the valleys 25 of the star wheel 21 when the movable contact 10b of the selector switch mechanism 10 is aligned in engagement with the corresponding stationary contact. Thus, the action of the star wheel 21 and resiliently biased followers 22 and 23 serve to index the movable contact of the selector switch mechanism 10 into engagement with the selected stationary contact.

In the specific form illustrated, the star wheel 21 is provided with twelve substantially equally spaced teeth 24 and intermediate valleys 25 which correspond to similarly spaced twelve contact positions 10a on the selector switch mechanism 10, as illustrated in FIG. 7. It will be understood that variations in the spacing between individual contact positions may be made so long as spacings on the star wheel 21 are similarly varied to provide indexing of the switch shaft corresponding to the desired positioning of the movable contact in engagement with the individual stationary contact positions of the selector switch mechanism 10.

In accordance with the present invention, means are provided for biasing the selector switch mechanism 10 toward a reference position and for resetting it to its reference position either manually or automatically. To effect such biasing of the selector switch mechanism, energy storing means 13, which may take the form of a power spring, is provided. In the form shown, one end of this spring is held in a slot 14' in the shaft 14 and the other end is secured to one of the spacers 31. The spacers 31 are mounted on bolts 32 which extend between the frame plate 11 and the selector switch mechanism 10. The spacers maintain the frame plate 11 and selector switch mechanism in spaced relationship.

For establishing a reference position for the selector switch mechanism, star wheel 21 is provided with a projection or extension 33 which extends toward the frame plate 11. A complementary projection 34 is provided on the frame plate 11 for engagement with projection 33, the engagement of these complementary projections establishing the reference position.

To effect manual disengagement of the follower 23 from the star wheel 21 and thereby, when the follower 22 is also out of engagement with the star wheel, to effect return of the switch mechanism to the reference position under the influence of the power spring 13, a manually operated cam lever 30 of bell crank configuration is provided. The lever 30 comprises a hub having two bell crank arms 43, 44 extending from the peripheral surface thereof. Arm 43 is arranged for engagement with an extension 42 on the bifurcated lever 29. For this purpose the arm 43 has a cutaway portion 45 arranged to receive the curved cam surface 46 of extension 42.

Figure 5:
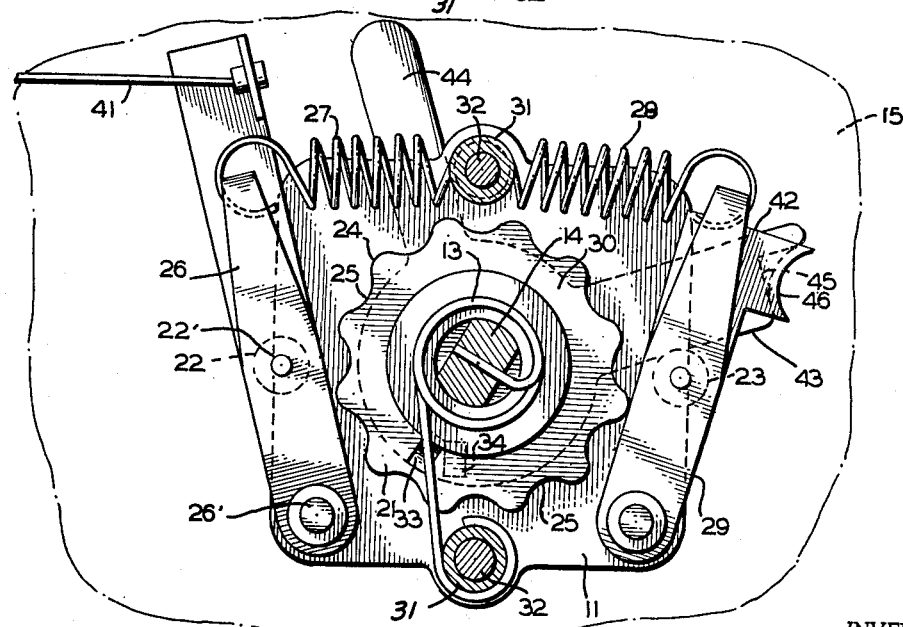
FIG. 5 is a view similar to FIG. 3 showing the parts in still another position.

To facilitate manual operation, arm 44 extends radially through the face panel to an easily accessible position. Arm 44 includes an axially extending portion 44' which passes through an arcuate slot 15' in the face panel 15, as most clearly shown in FIG. 2. This arrangement permits the arm 44 to extend externally of the face panel 15 on which the rotary switch is mounted, thereby facilitating accessibility and ease of operation of the lever 30 by the operator without exposing the working parts of the rotary switch. Rotation of the cam lever 30 by means of the arm 44 causes the cutaway portion 45 to ride over the curved cam surface 46 and firmly hold the bifurcated lever 29 and its associated follower 23 in the disengaged position. This position of the cam lever and the associated elements is shown in FIGS. 4 and 5.

For effecting automatic resetting of the selector switch mechanism 10 to its reference position the other bifurcated lever 26 is employed. For example, a pull wire 41 may be attached to an extension 40 on the bifurcated lever 26 and connected to a solenoid mechanism (not shown) so that pulsing or energization of the solenoid controls disengagement of the follower 22 from the star wheel 21.

It will be apparent from the drawings that both followers 22 and 23 must be out of engagement with the star wheel 21 in order to permit return of the selector switch mechanism 10 to its reference position under the influence of the power spring 13. If only one of the followers 22 or 23 is moved out of engagement with the star wheel, the star wheel will still be held against return movement by the engagement of the other follower therewith. Thus, by the arrangement described, the rotary switch may be returned to its reference position either manually or automatically depending on which of the follower disengaging mechanisms is last employed. If the bifurcated lever 29 and its associated follower 23 are first moved to the disengaged position manually by means of the arm 43 of the cam lever 30, the return movement of the switch to its reference position will be effected whenever the follower 22 is moved to its disengaged position, as by pulsing of the solenoid causing movement of the pull wire 41. Conversely, should the solenoid be pulsed to move the bifurcated lever 26 and its associated follower 22 first to the disengaged position, the switch may then be returned to its reference position under the influence of the spring 13 by the subsequent manual release of the follower 23 by means of the cam lever 30.

The operation of the rotary switch of this invenion may be summarized briefly as follows. Assuming the switch to be set to its reference position, the selector switch mechanism may be moved to any desired position by rotating the shaft 14 by means of knob 16, thereby establishing contact between the movable contact 10b and any selected one of the stationary contacts 10a. This movement of the switch causes energy to be stored in the spring 13 for biasing the switch toward its reference position. After completion of any series of operations, the structure automatically returns all of the rotary switches of the particular equipment to the reference position. Thus the operator desiring to "dial" preselected information into the electrical equipment may first set the cam lever 30 to engage the extension 42 of the bifurcated lever 29, thereby disengaging the associated follower 23 from the star wheel 21, as shown in FIGS. 4 and 5. The solenoid connected to the pull wire 41 may then be energized to effect disengagement of the follower 22, that is, moving it to the position shown in FIG. 5, whereupon the switch is returned to its reference position under the influence of the power spring 13. The energization of the solenoid may be controlled manually by an operator push button control or automatically by the pulsing thereof after the completion of a read-out. (The pull wire could be manually actuated to disengage the arm.) Any number of rotary switches may, of course, be controlled in this manner and the completion of a read-out may, therefore, be employed for automatically returning all of the rotary switches of the electrical equipment to their reference positions.

Alternatively, the follower 22 may be first moved to its disengaged position by the energization of the solenoid and the return of the rotary switch to its reference position may then be subsequently accomplished by manual release of the follower 23 by means of the cam lever 30. In either case, upon disengagement of both followers 22 and 23 from the star wheel 21, the power spring, which is preloaded upon the setting of the selector switch mechanism, returns the shaft 14 and the associated elements to the reference position wherein projections 33 and 34 are in engagement.

Although the invention has been described with respect to a rotary switch utilizing two resiliently biased followers, it is intended to be within the scope of this invention to utilize any number of followers from one to a plurality. These followers may be actuated manually or automatically as the need requires and any type of actuating means may be used such as, for example, mechanical, electrical or any combination thereof for disengaging the follower or followers from the indexing means utilized.

Although particular embodiments of the subject invention have been described, many modifications may be made, and it is intended by the appended claims to cover all such modifications which fall into the true spirit and scope of the invention.

What I claim as new and desire to be secured by Letters Patent of the United States is:

1. A rotary switch comprising, in combination: a frame, a plurality of stationary contacts mounted on said frame in a sequential arrangement, a rotatable shaft mounted on said frame, a movable contact connected to said shaft for movement therewith, said shaft moving said movable contact from a reference position into selective contact with said stationary contacts, indexing means comprising a star wheel fixedly mounted on said shaft for rotation therewith and for indexing said movable contact into aligned engagement with any selected one of said stationary contacts, first and second cam followers pivotally mounted to spaced points on said frame, a pair of springs each connected at one end to said frame and at their other ends to different ones of said cam followers for resiliently biasing said cam followers into engagement with the periphery of said star wheel, energy storage means connected between said frame and said shaft for biasing said shaft toward a given position upon rotation thereof, and disengaging means mounted on said frame for moving each of said cam followers away from engagement with said star wheel thereby causing said energy storage means to return said movable contact to its reference position.

2. A rotary switch comprising, in combination: a frame, a plurality of stationary contacts mounted on said frame in a sequential arrangement, a rotatable shaft mounted on said frame, a movable contact connected to said shaft for movement therewith, said shaft moving said movable contact from a reference position into selective contact with said stationary contacts, indexing means comprising a star wheel fixedly mounted on said shaft for rotation therewith and for indexing said movable contact into aligned engagement with any selected one of said stationary contacts, first and second cam followers pivotally mounted to spaced points on said frame, a pair of springs each connected at one end to said frame and at their other ends to different ones of said cam followers for resiliently biasing said cam followers into engagement with the periphery of said star wheel, energy storage means connected between said frame and said shaft for biasing said shaft toward a given position upon rotation thereof, and disengaging means for moving each of said cam followers away from engagement with said star wheel thereby causing said energy storage means to return said movable contact to its reference position, said disengaging means comprising a pair of lever arms mounted on said frame for sequentially biasing said first and second cam followers from engagement with said star wheel.

3. A rotary switch comprising in combination: a frame, a plurality of stationary contacts mounted on said frame in a sequential arrangement, a rotatable shaft mounted on said frame, a movable contact connected to said shaft for movement therewith, said shaft moving said movable contact from a reference position into selective contact with said stationary contacts, indexing means comprising a star wheel fixedly mounted on said shaft for rotation therewith and for indexing said movable contact into aligned engagement with any selected one of said stationary contacts, first and second cam followers pivotally mounted to spaced points on said frame, a pair of springs each connected at one end to said frame and at their other ends to different ones of said cam followers for resiliently biasing said cam followers into engagement with the periphery of said star wheel, energy storage means connected between said frame and said shaft for biasing said shaft toward a given position upon rotation thereof, and disengaging means for moving each of said cam followers away from engagement with said star wheel thereby causing said energy storage means to return said movable contact to its reference position, said disengaging means comprising a cam lever mounted on said shaft to extend laterally therefrom, said cam lever engaging the first of said cam followers upon predetermined rotation of said shaft for disengaging it from said star wheel.

4. A rotary switch comprising, in combination: a frame, a plurality of stationary contacts mounted on said frame in a sequential arrangement, a rotatable shaft mounted on said frame, a movable contact connected to said shaft for movement therewith, said shaft moving said movable contact from a reference position into selective contact with said stationary contacts, indexing means comprising a star wheel fixedly mounted on said shaft for rotation therewith and for indexing said movable contact into aligned engagement with any selected one of said series of stationary contacts, first and second cam followers pivotally mounted to spaced points on said frame, a pair of springs each connected at one end to said frame and at their other ends to different ones of said cam followers for resiliently biasing said cam followers into engagement with the periphery of said star wheel, said star wheel having a first projection thereon, a plate mounted on said frame juxtapositioned to said star wheel and provided with a second projection for engaging with said first projection for establishing a reference position for said shaft when said projections are in engagement, energy storage means connected between said frame and said shaft for biasing said shaft toward said reference position upon rotation thereof, and disengaging means mounted on said frame for moving each of said cam followers away from engagement with said star wheel thereby releasing said energy storage means to return said shaft to its reference position.

5. A rotary switch comprising, in combination: a frame, a plurality of stationary contacts mounted on said frame in a sequential arrangement, a rotatable shaft mounted on said frame, a movable contact connected to said shaft for movement therewith, said shaft moving said movable contact from a reference position into selective contact with said stationary contacts, indexing means comprising a star wheel fixedly mounted on said shaft for rotation therewith and for indexing said movable contact into aligned engagement with any selected one of said series of stationary contacts, first and second cam followers pivotally mounted to spaced points on said frame, a pair of springs each connected at one end to said frame and at their other ends to different ones of said cam followers for resiliently biasing said cam followers into engagement with the periphery of said star wheel, said star wheel having a first projection thereon, a plate mounted on said frame juxtapositioned to said star wheel and provided with a second projection for engagement with said first projection for establishing a reference position for said shaft when said projections are in engagement, energy storage means connected between said frame and said shaft for biasing said shaft toward said reference position upon rotation thereof, and disengaging means for moving each of said cam followers away from engagement with said star wheel thereby releasing said energy storage means to return said shaft to its reference position, said disengaging means comprising a cam lever mounted on said shaft to extend laterally therefrom for engaging the first of said cam followers upon predetermined rotation of said shaft for disengaging it from said star wheel and means for engaging the second of said cam followers for disengaging it from said star wheel.

6. A rotary switch comprising, in combination: a frame, a plurality of stationary contacts mounted on said frame in a sequential arrangement, a rotatable shaft mounted on said frame, a movable contact connected to said shaft for movement therewith, said shaft moving said movable contact from a reference position into selective contact with said stationary contacts, indexing means comprising a star wheel fixedly mounted on said shaft for rotation therewith and for indexing said movable contact into aligned engagement with any selected one of said series of stationary contacts, first and second cam followers pivotally mounted to spaced points on said frame, a pair of springs each connected at one end to said frame and at their other ends to different ones of said cam followers for resiliently biasing said cam followers into engagement with the periphery of said star wheel, said star wheel having a first projection thereon, a plate mounted on said frame juxtapositioned to said star wheel and provided with a second projection for engagement with said first projection for establishing a reference position for said shaft when said projections are in engagement, energy storage means connected between said frame and said shaft for biasing said shaft toward said reference position upon rotation thereof, and disengaging means for moving each of said cam followers away from engagement with said star wheel thereby releasing said energy storage means to return said shaft to its reference position, said disengaging means comprising a cam lever mounted on said shaft to extend laterally therefrom for engaging the first of said cam followers upon predetermined rotation of said shaft for disengaging it from said star wheel and solenoid means for engaging the second of said cam followers for sequentially disengaging is from said star wheel.

References Cited by the Examiner
UNITED STATES PATENTS

| | | | |
|---|---|---|---|
| 923,157 | 6/09 | Von Dreger | 200—11 |
| 1,896,850 | 2/33 | Perry | 200—166 X |
| 2,410,708 | 11/46 | Briether et al. | 74—526 X |
| 2,656,178 | 10/53 | Hughes | 267—64 |
| 2,771,520 | 11/56 | Stevens | 200—166 X |
| 2,831,368 | 4/58 | Bauer | 74—527 |
| 3,036,174 | 5/62 | Ardia et al. | 200—11 X |
| 3,119,905 | 1/64 | Nicolaus | 200—11 |

BERNARD A. GILHEANY, *Primary Examiner.*